United States Patent [19]

Pierce

[11] Patent Number: 5,125,437
[45] Date of Patent: Jun. 30, 1992

[54] PREFORM REMOVER APPARATUS

[75] Inventor: Garry Pierce, Houston, Tex.

[73] Assignee: Houston Industries Incorporated, Houston, Tex.

[21] Appl. No.: 722,523

[22] Filed: Jun. 27, 1991

[51] Int. Cl.⁵ .............................................. B21F 7/00
[52] U.S. Cl. ................................................. 140/123
[58] Field of Search ............................... 140/123, 124

[56] References Cited

U.S. PATENT DOCUMENTS

| | | |
|---|---|---|
| 1,045,679 | 11/1912 | Cronin . |
| 1,819,170 | 8/1930 | Hoene . |
| 2,096,244 | 10/1935 | Heinrich . |
| 2,556,663 | 6/1951 | Smalley . |
| 2,633,160 | 3/1953 | Currey . |
| 2,804,887 | 9/1957 | Reck .................................. 140/123 |
| 3,021,875 | 2/1959 | Coleman . |
| 3,959,869 | 6/1976 | Wyman et al. . |
| 4,132,441 | 1/1979 | Watkins . |
| 4,625,774 | 12/1986 | Stack, Jr. ............................ 140/123 |

*Primary Examiner*—Lowell A. Larson
*Attorney, Agent, or Firm*—Pravel, Gambrell, Hewitt, Kimball & Krieger

[57] ABSTRACT

An apparatus is provided for removing a protective armor wrapping, known as a preform, from a live electric power conductor. The apparatus mounts on an insulative rod, or hot stick, so that it can be remotely operated. The conductor is seated in a generally U-shaped, longitudinal channel member of the apparatus and then enclosed in the channel by a cover portion to form an elongated sleeve. After the conductor is in place within the sleeve formed between the cover and the channel member, the sleeve is moved along the conductor until a leading edge on the apparatus engages the preform. The preform is then stripped and unwound by rotating the apparatus.

14 Claims, 3 Drawing Sheets

PREFORM REMOVER APPARATUS

BACKGROUND OF THE INVENTION

1. Field of the Invention

The present invention relates to an apparatus for work on electric power distribution equipment. More particularly, it relates to an apparatus for removing a preform or tie wire wrapped about a live power transmission line typically at or near an insulator, but not only in these locations.

2. Description of the Prior Art

At times it has been necessary to service various parts of an electrical power transmission system, such as by replacing a transformer, without interrupting service. In doing so, the crew members had to work on the equipment in the presence of live transmission lines or conductors.

It was common practice for the electrical wire to have a preformed armor wire, or preform, coiled about it for strength against tension and bending. The preform usually had to be removed from the live electrical line to work on the electrical equipment.

In order to avoid electrical shock, the prior art offered several types of elongate insulative poles, called hot sticks, to which various kinds of preform removal tools could be attached. With the preform remover at a far or distal end from the crew member, power line work was relatively safe, albeit cumbersome. It was difficult to make connection with an end of the preform while manipulating an elongate hot stick.

Example preform removal tools included U.S. Pat. No. 1,045,679 and U.S. Pat. No. 2,096,244 which had removal tools with small engaging hooks or flanges on their far ends. These tools were undesirable, as disclosed above, because removal of preforms first required connection of the engaging portion of the tool to the preform. This often required several attempts to successfully hook the ends of the preform.

Additional examples included U.S. Pat. No. 1,819,170; U.S. Pat. No. 2,633,160 and U.S. Pat. No. 2,556,663 which had rotary unwrapping or wrapping tools on their far ends. These tools were undesirable because they had to be maintained substantially perpendicular to the conductor while the tool was manipulated during preform removal. This frequently rendered the tools incapable of removing a relatively inaccessible preform. Examples of inaccessible preforms were where the preform was recessed in an enclosure, was obstructed or where the crew member could not otherwise position the tool substantially perpendicular to the power line.

Additionally, the tools of the previously mentioned U.S. Pat. Nos. 1,819,170 and 2,633,160 were further undesirable because they could only engage the preform through a narrow slot. The tool of U.S. Pat. No. 2,633,160 also required the crew member, after mounting the tool on the power line, to connect with a loop or eyelet at the preform end with one of a pair of horns of a T-shaped hook. Finally, the tool of U.S. Pat. No. 2,566,663 did not provide any specific provision for preform unwrapping.

Other apparatus in the transmission line servicing field, but generally unrelated to preform removal, included U.S. Pat. No. 3,021,875; U.S. Pat. No. 3,959,869 and U.S. Pat. No. 4,132,441.

SUMMARY OF THE INVENTION

Briefly, the present invention provides a new and improved apparatus for removing a multi-stranded protective wrapping, known as a preform, from a live electrical power line. The apparatus includes a base member having a channel, into which the electric power conductor is seated, and a cover adapted to be mounted over the channel to form a sleeve enclosure around the conductor. An engagement handle extends outwardly from the sleeve for engagement by an insulative rod or hot stick. Additionally, an unwrapping mechanism which is attached to an end of the sleeve is provided for unwrapping the preform from the electrical power line.

The present invention also provides a method for removing a preform from a live electrical power line using a wrapping removal tool and at least one hot stick or insulative rod. First, the power line is seated within the tool. Then an end of the preform is pried loose. Finally, the tool is rotated with the insulative rod to uncoil or strip the preform from the power line.

DESCRIPTION OF THE PREFERRED EMBODIMENT

Figure 1:
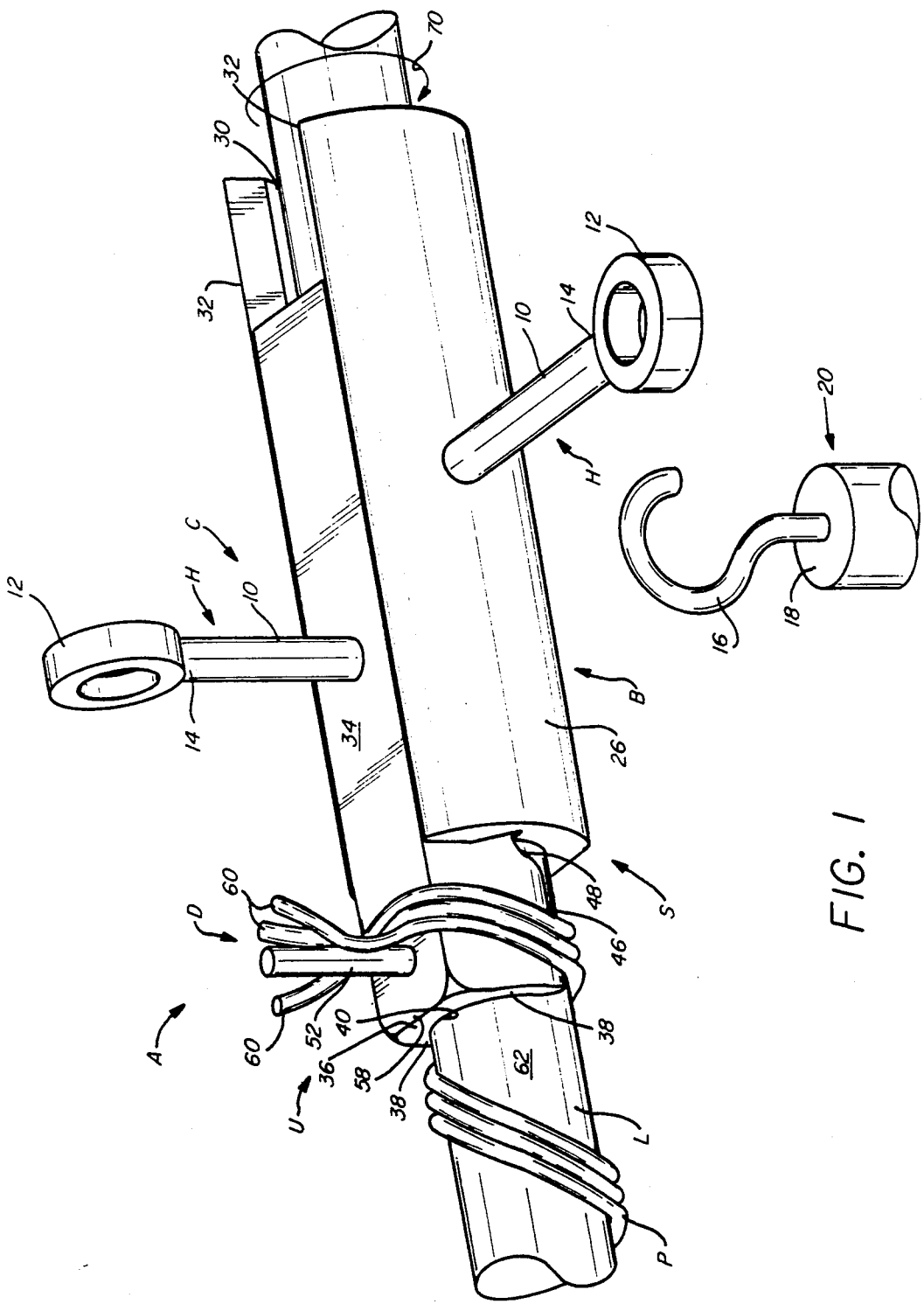
FIG. 1 is an isometric view showing a preform remover apparatus according to the present invention seated on a power line during removal of a preform.

In the drawings, the letter A designates generally a preform removing apparatus according to the present invention for removing a preform P (FIG. 1), beginning at an end D, from an electrical power line L. As is typical, the preform P is formed of several strands as a bundle of pre-formed wire which is helically wrapped or coiled about the line L to stiffen and strengthen it against bending and breakage. The preform removing apparatus A is particularly adapted for use when the line L is carrying live electrical power, although it can be used at other times as well.

The preform remover apparatus A is cast or otherwise suitably formed from a metal or synthetic resin of suitable strength, having a base member B which is fitted together with a cover C to form a sleeve S with a bore 10 (FIG. 2) through which the electrical power line L may be fitted. The sleeve member S is provided with at least one outwardly extending engagement handle H, preferably with each of the base member B and cover C having one of the engagement handles H mounted therewith. The preform remover apparatus A is also provided an unwrapping mechanism U formed on the cover C.

The engagement handles H with each of the base member B and cover C are of like structure and accordingly bear like reference numerals. Each engagement handle H includes an outwardly extending shaft 10 mounted in a mid portion of the base member B or cover C, respectively. The engagement handles E each also have an eyelet 12 mounted or formed at an outer end 14 of the shaft 10. The eyelet 12 is adapted to be engaged by and connected with a conventional connector mechanism or hook 16 at an end 18 of a hot stick or rod 20, permitting the member of the sleeve S to be mounted on the line L, as will be set forth.

The base member B is generally U-shaped in vertical cross-section, having a cylindrical channel 22 (FIG. 3) extending along its length into which the power line L may be seated or fitted. The base member B has a generally crescent-shaped body in vertical cross-section, including a central base portion 24 and upwardly extending side portions 26, the inner portions of which form a cylindrical inner wall 28 into which the power line L fits.

A pair of transversely extending grooves or guide slots 30 are formed the inner wall 28 along the length of the base member B, while flat upper surfaces 32 are formed on each of the side portions 26 of base member B.

The cover C has a generally flat upper surface 34 on which the outwardly extending shaft 10 is mounted. The cover member C is generally in the form of an inverted U in vertical cross-section, having a central upper portion 36 beneath upper surface 34 and downwardly extending legs 38, within which is formed a common inner cylindrical wall 40. The inner cylindrical wall 40 of cover C and inner wall 28 of base member B form a generally tubular wall of the sleeve member S defining the channel 22 into which the line L fits.

Outwardly flaring skirt members 42 are formed at lower ends 44 of each of the legs 38 along a substantial portion of the length of the cover C. The skirt members 42 are adapted to fit within and slide along the slots 30 in the base member B permitting relative sliding movement between the base member B and cover C.

A stop shoulder 46 is formed on a leading edge or end E of each of the legs 38 of the cover member C, beginning at a contact position 48 where skirt members 42 terminate. Stop shoulders 46 are larger than the grooves 30 in the base member B and accordingly cannot be fitted into them.

Figure 3:
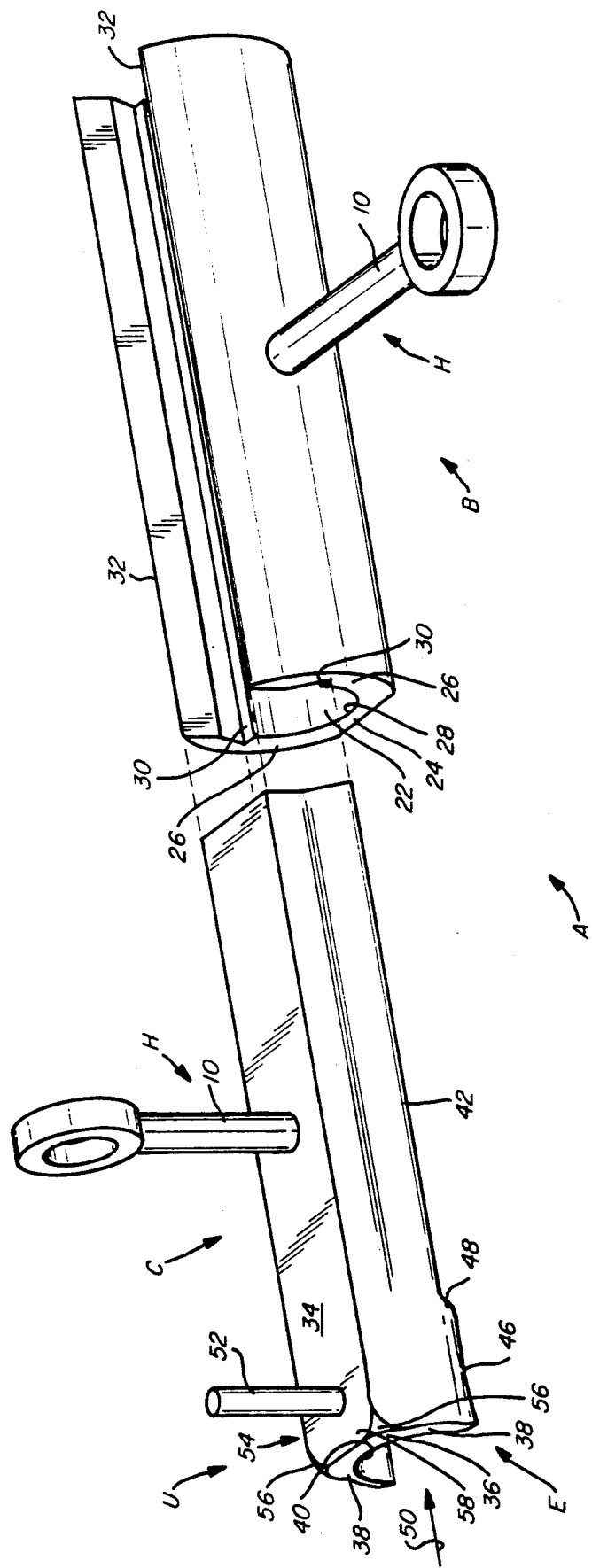
FIG. 3 is an exploded isometric view of the preform remover apparatus of FIG. 2.

The cover member C when fitted in the base member B is thus slidable therein along the length of the skirt members 42 in the direction of the longitudinal axis of the line L, as indicated by an arrow 50 (FIG. 3). Such movement occurs until the stop shoulders 46 are contacted. When this occurs, relative movement of base member B with respect to the cover member C in the direction of the arrow 50 ceases.

The unwrapping mechanism U is mounted on the cover C above the leading edge E spaced from the shaft 10. The unwrapping mechanism U includes a wire stripping contact probe 52 mounted on the upper surface 34 of cover member C behind the leading edge E. The wire stripping contact probe 52 extends outwardly from the leading edge E in a direction generally perpendicular to the longitudinal axis of the line L. It should be understood, however, that the perpendicular extension of the probe 62 is merely a preferred orientation and that any suitable transverse orientation with respect to the longitudinal axis of the line L may be selected.

The unwrapping mechanism U also includes a tapered nose portion 54 of leading edge E. The tapered nose portion 54 is formed by chamfered shoulders 56 formed at the juncture of upper surface 36 and legs 38 at the leading edge E of cover C. The tapered nose portion 54 has a relatively thin leading edge 58 which can be fitted between end portions 60 of the preform P and an outer surface 62 of the electrical line L. The chamfered shoulders 56 taper outwardly form leading edge 68 to force the preform P further away from the line L.

The leading edge 58 when fitted between the preform P and the line L wedges the preform P slightly away from the line L, with the chamfered shoulders 56 forcing the preform P further outwardly to a position (FIG. 1) where the probe 52 is positioned in a wire stripping position between the preform P and the line L.

In the operation of the present invention, the base member B is attached to a hot stick and moved into a position near the preform P where the line L is fitted into the channel 22. The base member B is kept in this position while the cover member C is mounted on a second hot stick and brought into a position (FIG. 3) where the cylindrical wall 40 fits over the line L. The cover C is thus in a position atop the line L, and it is slid along the line L toward the base member B.

Figure 2:
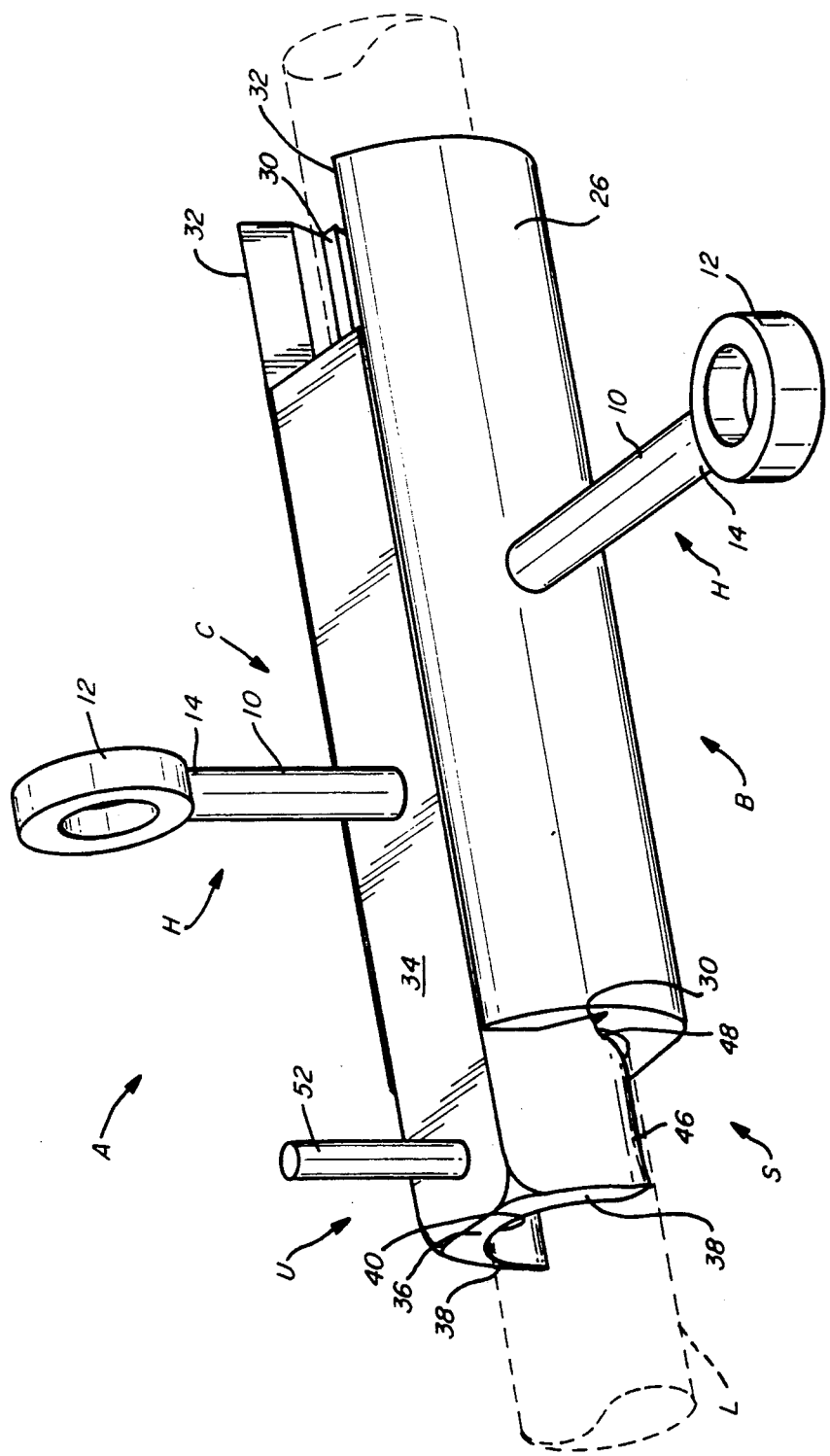
FIG. 2 is an isometric view of the preform remover apparatus of FIG. 1.

As the cover member C and base member B are thus brought together, the skirt members 42 of cover C are fitted into grooves 40 of base member B, in effect forming the sleeve S and defining the channel 22. The cover C and base member B are then slid together until stop shoulders 46 contact the base member B (FIG. 2). The hot stick holding the base member B is no longer needed and can be removed, since the hot stick holding the cover C exerts adequate force to keep the members of the sleeve S together.

The sleeve S is then moved along the line L until the leading edge 58 of nose portion 54 contacts the preform P. The leading edge 58 is then wedged between the preform P and the line L by moving the sleeve S along the line L. The sleeve S is then moved further so that the chamfered shoulders 56 force the preform P outwardly far enough so that the wire stripping probe 52 fits between the preform P and the line L (FIG. 3).

In this position, the hot stick engaging the cover member C is manipulated to rotate the sleeve S circumferentially about the line L, as indicated by an arrow 70, while moving the sleeve S longitudinally along the line L in the direction of the preform P. Longitudinal and rotational movement of the sleeve S along the line L in this manner causes the probe 52 to rotate about the line L, uncoiling and stripping the helically wound preform P from the line L until complete separation occurs.

Having described the invention above, various modifications of the techniques, procedures, material and equipment will be apparent to those in the art. It is intended that all such variations within the scope and spirit of the appended claims be embraced thereby.

I claim:

1. An apparatus for stripping off a wrapped wire from an electrical power line comprising:
   a sleeve member comprising:
      a base member having a channel formed therein for fitting the electrical power line therethrough;
      a cover adapted to be mounted onto said base member, forming a bore therewith for passage of the electrical power line therethrough;
   an engagement handle extending outwardly from said sleeve member for enqaqement by an insulative rod; and
   means attached to an end of said sleeve member for unwrapping the wire from the electrical power line.

2. The apparatus of claim 1 wherein said means for unwrapping the wire from the electrical power line comprises:
   a leading edge protruding longitudinally from said end of said sleeve member for wedging an end portion of the wire away from the electrical power line; and a wire stripping contact probe extending outwardly from said end of said sleeve;

said contact probe being mounted on said sleeve member behind said leading edge for forcing the wedged end portion of the wire away from the power conductor.

3. The apparatus of claim 1 wherein:

said engagement handle is mounted with said base member for engagement by an insulative rod.

4. The apparatus of claim 3 further comprising:

a second engagement handle extending outwardly from said cover for manipulation with an insulative rod.

5. The apparatus of claim 1, wherein:

said cover has outwardly extending tongue edges formed along a portion of its length; and said base member has longitudinally recessed grooves formed within said channel for receiving said tongue edges of said cover therein.

6. The apparatus of claim 5 further comprising:

a stop shoulder formed on said cover member adjacent said tongue edges.

7. The apparatus of claim 6, wherein:

said stop shoulder extends outwardly beyond said tongue edges on said cover to engage said base member and limit movement of said cover with respect to said base member.

8. The apparatus of claim 6 wherein said means for unwrapping includes:

a leading edge formed on said cover member extending outwardly beyond said tongue edges.

9. The apparatus of claim 8, wherein:

said stop shoulder is formed on said cover member rearwardly from said leading edge.

10. The apparatus of claim 9 wherein said cover has a generally cylindrical slot formed therein to form a generally cylindrical bore with said channel in said base member.

11. The apparatus of claim 8, wherein:

said leading edge has a chamfered nose portion for fitting beneath and wedging the end portion of the wire away from the electrical power line.

12. The apparatus of claim 1 wherein said channel in said base member is generally cylindrical.

13. A method for removing a wrapped wire from an electrical power line with at least one insulative rod and a wrapping removal tool comprising the steps of:

seating the electrical power line within the wrapping removal tool mounted on an insulative rod;

prying loose an end of the wrapped wire with the wrapping removal tool to separate the wrapped wire from the electrical power line;

rotating the wrapping removal tool with the insulative rod; and stripping the separated portion of the wrapped wire from the electrical power line during said step of rotating.

14. The method of claim 13 wherein said seating step comprises the steps of:

inserting the electrical power line into a channel formed in the wrapping removal tool; and enclosing the electrical power line within the wrapping removal tool by mounting a cover of the wrapping removal tool over the channel to form a bore through which the electrical power line passes.

* * * * *